United States Patent
Yu et al.

(10) Patent No.: US 11,454,772 B2
(45) Date of Patent: Sep. 27, 2022

(54) SHORT-WAVEBAND ACTIVE OPTICAL COMPONENT BASED ON VERTICAL EMITTING LASER AND MULTI-MODE OPTICAL FIBER

(71) Applicant: c/o FUZHO PHOTOP OPTICS CO., LTD, Fujian (CN)

(72) Inventors: Guanglong Yu, Fujian (CN); Hong Huang, Fujian (CN); Zihang Wang, Fujian (CN)

(73) Assignee: FUZHOU PHOTOP OPTICS CO., LTD, Fujian (CN)

( * ) Notice: Subject to any disclaimer, the term of this patent is extended or adjusted under 35 U.S.C. 154(b) by 0 days.

(21) Appl. No.: 17/259,401

(22) PCT Filed: Sep. 21, 2018

(86) PCT No.: PCT/CN2018/106985
§ 371 (c)(1),
(2) Date: Jan. 11, 2021

(87) PCT Pub. No.: WO2020/015159
PCT Pub. Date: Jan. 23, 2020

(65) Prior Publication Data
US 2021/0278613 A1     Sep. 9, 2021

(30) Foreign Application Priority Data
Jul. 14, 2018   (CN) .......................... 201810773312.4

(51) Int. Cl.
*G02B 6/42*     (2006.01)
*G02B 6/293*    (2006.01)
(Continued)

(52) U.S. Cl.
CPC ......... *G02B 6/4246* (2013.01); *G02B 6/2938* (2013.01); *G02B 6/29373* (2013.01);
(Continued)

(58) Field of Classification Search
CPC .............. G02B 6/4246; G02B 6/29373; G02B 6/2938; G02B 6/43; G02B 6/42;
(Continued)

(56) References Cited

U.S. PATENT DOCUMENTS

| 9,229,167 | B2 * | 1/2016 | Chang ................. G02B 27/123 |
| 2006/0239608 | A1 | 10/2006 | Akashi |
| 2017/0131492 | A1 * | 5/2017 | Vallance ................ G02B 6/423 |

FOREIGN PATENT DOCUMENTS

| CN | 202351467 U | 7/2012 |
| CN | 104734800 A | 6/2015 |

(Continued)

OTHER PUBLICATIONS

International Search Report and Written Opinion in PCT Appl. PCT/CN2018/106985, dated Apr. 16, 2019.

*Primary Examiner* — Leslie C Pascal
(74) *Attorney, Agent, or Firm* — Blank Rome LLP

(57) ABSTRACT

A short-waveband active optical component based on a vertical emitting laser and a multi-mode optical fiber (3) is provided. In the component, multiple VCSELs (11) are configured to be used for generating multiple optical signals of different wavelengths; multiple photodiodes (15) are configured to be used for receiving the optical signals emitted by the VCSELs (11); two focusing lens arrays (12, 22) or lens array group elements are configured to be used for collimating and focusing optical signals at an emitting end (1) and a receiving end (2); two Z-block-shaped prisms (13, 23) are configured to be used for a light combining function of the emitting end (1) of the optical component and a light splitting function of the receiving end (2); one multi-mode optical fiber (3) is configured to be used for transmitting the optical signals generated by the VCSELs (11); and two focusing lenses (14, 24) are configured to be used for collimating and focusing optical signals at two ends (Continued)

of the multi-mode optical fiber (3). The short-waveband active optical component has a small size and a high transmission rate.

20 Claims, 2 Drawing Sheets

(51) Int. Cl.
    *G02B 6/43*     (2006.01)
    *H04B 10/2581*     (2013.01)
    *H04B 10/50*     (2013.01)
    *H04B 10/66*     (2013.01)
    *H04J 14/02*     (2006.01)
    *H04B 10/25*     (2013.01)

(52) U.S. Cl.
    CPC ........... *G02B 6/43* (2013.01); *H04B 10/2581* (2013.01); *H04B 10/2589* (2020.05); *H04B 10/503* (2013.01); *H04B 10/5057* (2013.01); *H04B 10/66* (2013.01); *H04J 14/02* (2013.01)

(58) Field of Classification Search
    CPC .. G02B 6/4206; G02B 6/4214; G02B 6/4295; G02B 6/4296; H04B 10/2581; H04B 10/2589; H04B 10/503; H04B 10/5057; H04B 10/66; H04J 14/02; H04J 14/04
    See application file for complete search history.

(56) References Cited

FOREIGN PATENT DOCUMENTS

| | | | |
|---|---|---|---|
| CN | 107102405 A | 8/2017 | |
| CN | 107577015 A | 1/2018 | |
| CN | 207488555 A | 6/2018 | |
| WO | WO-02056077 A2 * | 7/2002 | ............ A01N 37/46 |

* cited by examiner

SHORT-WAVEBAND ACTIVE OPTICAL COMPONENT BASED ON VERTICAL EMITTING LASER AND MULTI-MODE OPTICAL FIBER

TECHNICAL FIELD

The present invention relates to the fields of communication optics and data transmission, and in particular, to a short-waveband active optical component based on a vertical emitting laser and a multi-mode optical fiber, which can be used in a short-medium range high-definition multimedia interface (HDMI) device to achieve a short-wave wavelength division multiplexing (SWDM) function.

BACKGROUND

The high-definition multimedia interface (HDMI) technology is a fast data transmission technology widely used in optical communications. At present, an HDMI device has a relatively short transmission distance and a relatively small transmission rate, and the length of the HDMI device cannot be adjusted freely according to actual installation requirements; therefore, it has gradually been unable to meet the requirements of big data (≥4 K) transmission.

Based on a short-wavelength VCSEL laser signal light source and the optical fiber transmission technology, a new type of active optical component that can realize high-speed transmission of long-distance data signals and can adjust the length of a data line freely according to actual installation requirements is derived in the present patent.

SUMMARY OF THE INVENTION

In view of the existing technology, the purpose of the present invention is to provide a short-waveband active optical component based on a vertical emitting laser and a multi-mode optical fiber, which is low in cost, small in size, high in transmission rate, and capable of realizing the SWDM function in a short-medium range HDMI device.

In order to achieve the above technical objective, the technical solution adopted by the present invention is:

A short-waveband active optical component based on a vertical emitting laser and a multi-mode optical fiber, including an emitting end, a receiving end, and one multi-mode optical fiber;

the emitting end including multiple VCSELs, a first focusing lens array, a first Z-block-shaped prism, and a first focusing lens that are arranged in sequence, the first Z-block-shaped prism having multiple incident faces and an exit end, and the first focusing lens facing the exit end of the first Z-block-shaped prism;

the receiving end including multiple photodiodes, a second focusing lens array, a second Z-block-shaped prism, and a second focusing lens that are arranged in sequence, the second Z-block-shaped prism having multiple exit faces and an incident end, and the second focusing lens facing the incident end of the second Z-block-shaped prism; and one end of the one multi-mode optical fiber facing the first focusing lens, and the other end facing the second focusing lens;

wherein, the multiple VCSELs are configured to be used for generating multiple optical signals of different wavelengths;

the multiple photodiodes (PDs) are configured to be used for receiving the optical signals emitted by the VCSELs;

the first focusing lens array and the second focusing lens array are configured to be used for collimating and focusing optical signals at the emitting end (Tx end) and the receiving end (Rx end);

the first Z-block-shaped prism and the second Z-block-shaped prism are configured to be used for a light combining (MUX) function of the emitting end (Tx end) of the optical component and a light splitting (DEMUX) function of the receiving end (Rx end); and the multi-mode optical fiber (MMF) is configured to be used for transmitting the optical signals generated by the VCSELs.

In addition, an output end and an input end may also each be packaged by a shell.

After the multiple VCSELs at the emitting end emit laser signals into the first focusing lens array, the first focusing lens array focuses the optical signals and correspondingly emits them into the multiple incident faces of the first Z-block-shaped prism. The exit end of the first Z-block-shaped prism emits the received optical signals to the first focusing lens, so that the first focusing lens inputs the optical signals to one end of the multi-mode optical fiber, and the multi-mode optical fiber transmits the optical signals to the other end so as to be emitted to the second focusing lens. The second focusing lens emits the optical signals into the incident end of the second Z-block-shaped prism, and then the second Z-block-shaped prism emits the signal light correspondingly from its multiple exit faces into the second focusing lens array, so that the second focusing lens array focuses the optical signals onto the multiple photodiodes facing it.

Further, the multiple photodiodes at the receiving end are arranged in parallel, and one ends thereof are also provided with VCSELs for sending feedback signals. The focusing lenses of the second focusing lens array one-to-one correspond to the photodiodes and the VCSELs at the receiving end, and the multiple exit faces of the second Z-block-shaped prism one-to-one correspond to the photodiodes and the VCSELs at the receiving end. The multiple VCSELs at the emitting end are arranged in parallel, and one ends thereof are also provided with photodiodes for receiving feedback signals. The focusing lenses of the first focusing lens array one-to-one correspond to the VCSELs and the photodiodes at the emitting end, and the multiple incident faces of the first Z-block-shaped prism one-to-one correspond to the VCSELs and the photodiodes at the emitting end.

Preferably, the emitting end has 3 to 14 VCSELs and at least one photodiode; and the receiving end has 3 to 14 photodiodes and at least one VCSEL.

Preferably, the arrangement spacing between adjacent VCSELs or between adjacent photodiodes or between the VCSEL and the photodiode at the receiving end or emitting end is 0.25 mm to 1 mm.

Preferably, the first focusing lens array at the emitting end and the second focusing lens array at the receiving end are both spherical lenses or aspheric lenses.

Preferably, the first Z-block-shaped prism at the emitting end and the second Z-block-shaped prism at the receiving end each have a thickness of 0.2 mm to 3 mm, and they are arranged obliquely to form an angle of 6° to 45° with the end of the multi-mode optical fiber, the emitting end of the VCSEL, or the receiving end of the PD.

Preferably, the multi-mode optical fiber is a transparent optical fiber, and the core diameter of its fiber core is not less than 0.03 mm.

Preferably, the first focusing lens and the second focusing lens are both spherical lenses or aspheric lenses integrally formed by injection molding, molding, or photolithography.

In an application of a short-waveband active optical component based on a vertical emitting laser and a multi-mode optical fiber as described above, it is used in a high-definition multimedia interface device.

A short-waveband active optical component includes the above short-waveband active optical component based on a vertical emitting laser and a multi-mode optical fiber, and has an operating wavelength of 600 nm to 1000 nm and a wavelength channel interval of 20 nm to 100 nm.

By adopting the above technical solution, the present invention has the following beneficial effects: the present invention uses a multi-channel short-waveband laser and a single multi-mode optical fiber for performing data transmission, which is advantageous in a small size, high transmission rate, low cost, long transmission distance, adjustable length, and the like, thus having a broad commercial prospect.

BRIEF DESCRIPTION OF THE DRAWINGS

The present invention will be further elaborated below with reference to accompanying drawings and specific implementation manners.

DETAILED DESCRIPTION

Figure 1:
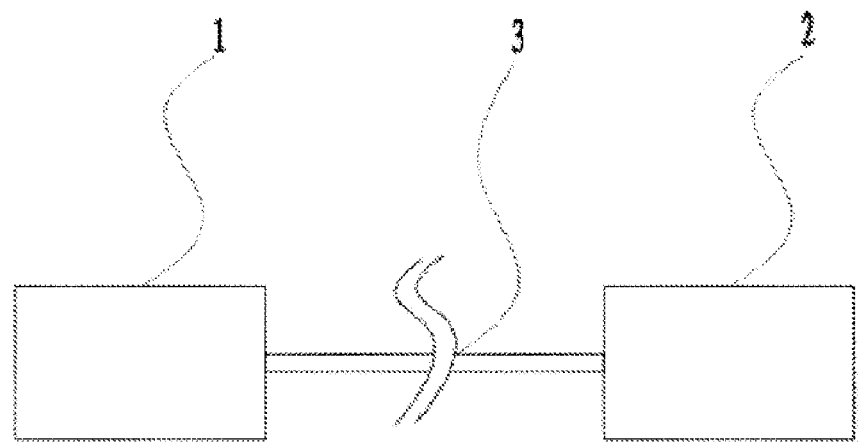
FIG. 1 is a schematic diagram of a brief implementation structure according to Embodiment 1 of the present invention.

A short-waveband active optical component based on a vertical emitting laser and a multi-mode optical fiber includes an emitting end, a receiving end, and one multi-mode optical fiber;

the emitting end including multiple VCSELs, a first focusing lens array, a first Z-block-shaped prism, and a first focusing lens that are arranged in sequence, the first Z-block-shaped prism having multiple incident faces and an exit end, and the first focusing lens facing the exit end of the first Z-block-shaped prism;

the receiving end including multiple photodiodes, a second focusing lens array, a second Z-block-shaped prism, and a second focusing lens that are arranged in sequence, the second Z-block-shaped prism having multiple exit faces and an incident end, and the second focusing lens facing the incident end of the second Z-block-shaped prism; and one end of the one multi-mode optical fiber facing the first focusing lens, and the other end facing the second focusing lens;

wherein, the multiple VCSELs are configured to be used for generating multiple optical signals of different wavelengths;

the multiple photodiodes (PDs) are configured to be used for receiving the optical signals emitted by the VCSELs;

the first focusing lens array and the second focusing lens array are configured to be used for collimating and focusing optical signals at the emitting end (Tx end) and the receiving end (Rx end);

the first Z-block-shaped prism and the second Z-block-shaped prism are configured to be used for a light combining (MUX) function of the emitting end (Tx end) of the optical component and a light splitting (DEMUX) function of the receiving end (Rx end); and the multi-mode optical fiber (MMF) is configured to be used for transmitting the optical signals generated by the VCSELs.

In addition, an output end and an input end may also each be packaged by a shell.

After the multiple VCSELs at the emitting end emit laser signals into the first focusing lens array, the first focusing lens array focuses the optical signals and correspondingly emits them into the multiple incident faces of the first Z-block-shaped prism. The exit end of the first Z-block-shaped prism emits the received optical signals to the first focusing lens, so that the first focusing lens inputs the optical signals to one end of the multi-mode optical fiber, and the multi-mode optical fiber transmits the optical signals to the other end so as to be emitted to the second focusing lens. The second focusing lens emits the optical signals into the incident end of the second Z-block-shaped prism, and then the second Z-block-shaped prism emits the signal light correspondingly from its multiple exit faces into the second focusing lens array, so that the second focusing lens array focuses the optical signals onto the multiple photodiodes facing it.

Further, the multiple photodiodes at the receiving end are arranged in parallel, and one ends thereof are also provided with VCSELs for sending feedback signals. The focusing lenses of the second focusing lens array one-to-one correspond to the photodiodes and the VCSELs at the receiving end, and the multiple exit faces of the second Z-block-shaped prism one-to-one correspond to the photodiodes and the VCSELs at the receiving end. The multiple VCSELs at the emitting end are arranged in parallel, and one ends thereof are also provided with photodiodes for receiving feedback signals. The focusing lenses of the first focusing lens array one-to-one correspond to the VCSELs and the photodiodes at the emitting end, and the multiple incident faces of the first Z-block-shaped prism one-to-one correspond to the VCSELs and the photodiodes at the emitting end.

Preferably, the emitting end has 3 to 14 VCSELs and at least one photodiode; and the receiving end has 3 to 14 photodiodes and at least one VCSEL.

Preferably, the arrangement spacing between adjacent VCSELs or between adjacent photodiodes or between the VCSEL and the photodiode at the receiving end or emitting end is 0.25 mm to 1 mm.

Preferably, the first focusing lens array at the emitting end and the second focusing lens array at the receiving end are both spherical lenses or aspheric lenses.

Preferably, the first Z-block-shaped prism at the emitting end and the second Z-block-shaped prism at the receiving end each have a thickness of 0.2 mm to 3 mm, and they are arranged obliquely to form an angle of 6° to 45° with the end of the multi-mode optical fiber, the emitting end of the VCSEL, or the receiving end of the PD.

Preferably, the multi-mode optical fiber is a transparent optical fiber, and the core diameter of its fiber core is not less than 0.03 mm.

Preferably, the first focusing lens and the second focusing lens are both spherical lenses or aspheric lenses integrally formed by injection molding, molding, or photolithography.

In an application of a short-waveband active optical component based on a vertical emitting laser and a multi-mode optical fiber as described above, it is used in a high-definition multimedia interface device.

A short-waveband active optical component includes the above short-waveband active optical component based on a vertical emitting laser and a multi-mode optical fiber, and has an operating wavelength of 600 nm to 1000 nm and a wavelength channel interval of 20 nm to 100 nm.

Embodiment 1

As shown in FIG. 1, the present invention includes emitting end 1, receiving end 2, and multi-mode optical fiber 3.

Figure 2:
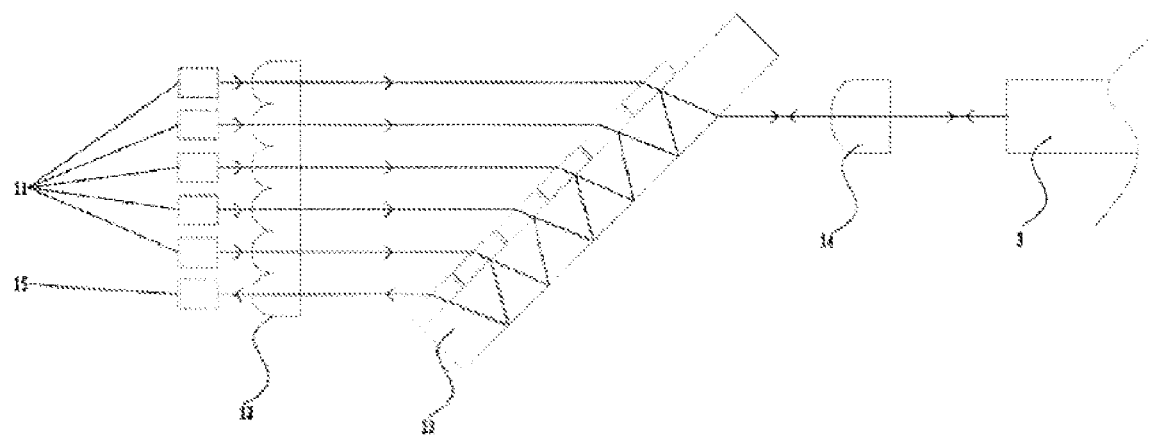
FIG. 2 is a schematic brief structural diagram of an emitting end according to Embodiment 1 of the present invention.

As shown in FIG. 2, a brief implementation structure of the emitting end (a TX end module) of the structure according to Embodiment 1 of the present invention is shown, which is a 6-channel Tx end module, and includes five VCSELs 11, one photodiode 15, first focusing lens array 12, first Z-block-shaped prism 13, and first focusing lens 14 that are arranged in sequence. First Z-block-shaped prism 13 has six incident faces and an exit end. First focusing lens 14 faces the exit end of first Z-block-shaped prism 13, and one end of multi-mode optical fiber 3 faces first focusing lens 14. One photodiode 15 and five VSCSLEs 11 are arranged in parallel. Corresponding parts of first Z-block-shaped prism 13 from its exit end to its incident faces at the other end are block1, block2, block3, block4, block5, and block6 in sequence. Block6 faces first focusing lens 14 and photodiode 15 in sequence.

The specific working process is that: lasers (730±10 nm, 760±10 nm, 790±10 nm, 825±10 nm, 850±10 nm) emitted by VCSELs 11 on five channels are collimated by first focusing lens array 12, and enter first Z-block-shaped prism 13 from a broadband antireflection film on the left. The lasers hit block5 first, then are multistage reflected by block4 to block1, finally exit from an antireflection film surface of block1, and coupled into multi-mode optical fiber 3 by first focusing lens 14. By analogy, the lasers passing through block4 to block1 are coupled into multi-mode optical fiber 3 one by one by first focusing lens 14 to realize the MUX function. A feedback laser signal (730±10 nm) exiting from multi-mode optical fiber 3 (MMF) (i.e., the exit end) is collimated by the first focusing lens and hits block1, enters block2 after reflection, then enters block6 after multistage reflection by block2 to block5, exits from block6 and enters first focusing lens array 12, and finally focuses on PD6, so that the feedback signal is collected.

Figure 3:
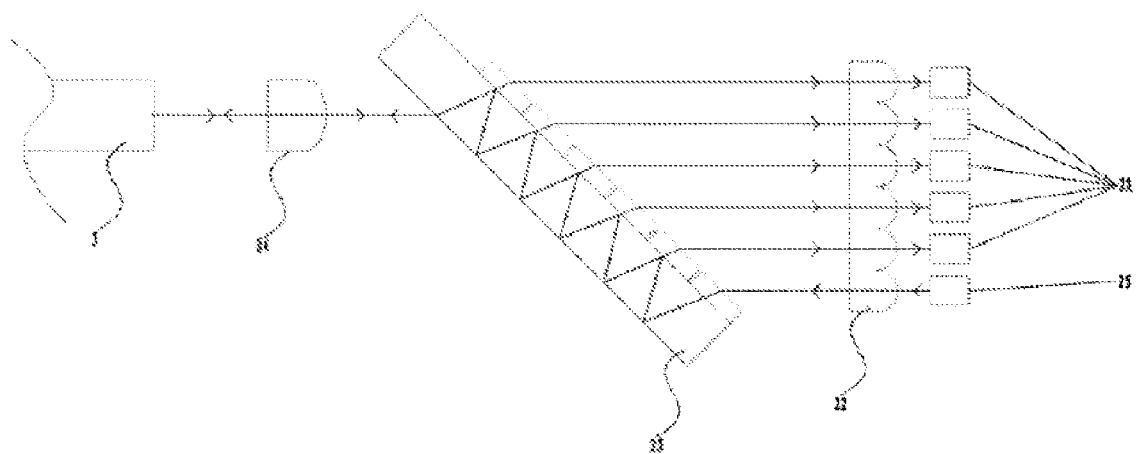
FIG. 3 is a schematic brief structural diagram of a receiving end according to Embodiment 1 of the present invention.

As shown in FIG. 3, a brief implementation structure of the receiving end (an RX end module) of the structure according to Embodiment 1 of the present invention is shown, which is a 6-channel Rx end module corresponding to the implementation structure of FIG. 2, and includes one VCSEL 25, five photodiodes 21 (i.e., PDs), second focusing lens array 22, second Z-block-shaped prism 23, and second focusing lens 24 that are arranged in sequence. Second Z-block-shaped prism 23 has six exit faces and one incident end. Second focusing lens 24 faces the incident end of second Z-block-shaped prism 23. The other end of multi-mode optical fiber 3 faces second focusing lens 24. Photodiodes 21 and one VSCSLE 25 are arranged in parallel. Corresponding parts of second Z-block-shaped prism 23 from its incident end to the exit faces at the other end are block1', block2', block3', block4', block5', and block6' in sequence. Block6' faces second focusing lens 14 and VCSEL 25 in sequence.

The specific working process is that: laser signals at five bands (730±10 nm, 750±10 nm, 770±10 nm, 790±10 nm, 810±10 nm) exited by multi-mode optical fiber 3 (i.e., MMF) are collimated by second focusing lens 24, hit block1', enter block2' after reflection, then enter second focusing lens array 22 after exiting through block2' to block5', and are finally focused on PD1 to PD5 (i.e., the corresponding five photodiodes 21). A feedback laser signal (730±10 nm) transmitted from VCSEL 25 is collimated by first focusing lens array 22 and enters Z-block-shaped prism 23 from the broadband antireflection film. The laser hits block5' first, then is multistage reflected by block4' to block1', finally exits from an antireflection film surface of block1' (that is, the incident end), and then is focused and coupled into multi-mode optical fiber 3 through second focusing lens 24.

In this embodiment, a method of manufacturing the first Z-block-shaped prism or the second Z-block-shaped prism briefly includes the following steps:

1. Design & process prisms: Sizes and thicknesses of the prisms are designed according to requirements (including the number of channels and the channel spacing) of different channels, and by using the optical cold processing method, the parallelism, thickness and angle of the prisms are controlled strictly. Finally, regional coating (broadband antireflection film+broadband high reflection film) is performed.

2. Design & process filters: The filters are core components of light splitting. The coating design software is used to design the filters according to requirements of different channels. The key points of designing lie in the flatness of a coating curve and the drift of a center wavelength. In processing, the filters are usually prepared by coating a Wafer with good parallelism and surface shape, then cutting the wafer, and performing inspection and selection for use.

Figure 4:
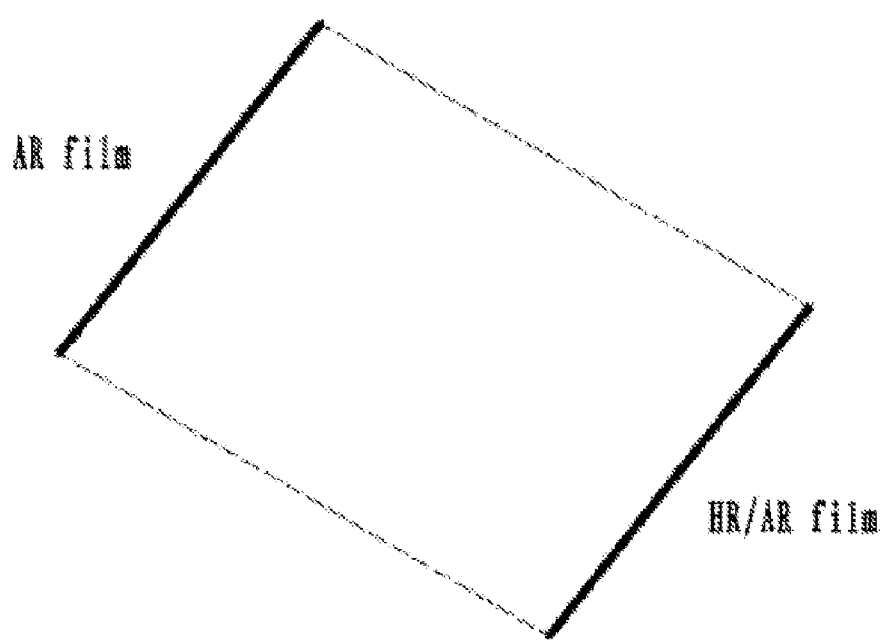
FIG. 4 is a schematic diagram of Z-block-shaped prism gluing pieces at the emitting end and the receiving end according to Embodiment 1 of the present invention.

3. Assemble the assembly: The above prisms and the various filters are attached to obtain the structure shown in FIG. 4. The consistency of an adhesive layer in the process of attaching should be paid attention to, and undesirable phenomena such as air bubbles and misalignment should be avoided at the same time.

The above are the embodiments of the present invention. For those of ordinary skill in the art, according to the teachings of the present invention, equivalent changes, modifications, replacements, and variations made in accordance with the scope of the patent application of the present invention without departing from the principle and spirit of the present invention should all fall within the scope of the present invention.

The invention claimed is:

1. A short-waveband active optical component, comprising an emitting end, a receiving end, and one multi-mode optical fiber;

the emitting end comprising multiple vertical-cavity surface-emitting lasers (VCSELs), a first focusing lens array, a first Z-block-shaped prism, and a first focusing lens that are arranged in sequence, the first Z-block-shaped prism having multiple incident faces and an exit end, the first focusing lens facing the exit end of the first Z-block-shaped prism;

the receiving end comprising multiple photodiodes, a second focusing lens array, a second Z-block-shaped prism, and a second focusing lens that are arranged in sequence, the second Z-block-shaped prism having multiple exit faces and an incident end, the second focusing lens facing the incident end of the second Z-block-shaped prism; and a first end of the one multi-mode optical fiber facing the first focusing lens, and a second end facing the second focusing lens;

wherein the multiple VCSELs at the emitting end are configured to emit optical signals into the first focusing lens array, the first focusing lens array being configured to focus the optical signals to the multiple incident faces of the first Z-block-shaped prism, the exit end of the first Z-block-shaped prism being configured to output the optical signals to the first focusing lens, the first focusing lens being configured to input the optical signals to the first end of the multi-mode optical fiber;

wherein the multi-mode optical fiber is configured to transmit the optical signals to the second end so as to be output to the second focusing lens;

wherein the second focusing lens is configured to focus the optical signals to the incident end of the second Z-block-shaped prism, the exit faces of the second Z-block-shaped prism being configured to output the optical signals to the second focusing lens array, the second focusing lens array being configured to focus the optical signals to the multiple photodiodes facing the second focusing lens array;

wherein the multiple photodiodes at the receiving end are arranged in parallel, one end thereof having at least one feedback VCSEL configured to send a feedback signal, lenses of the second focusing lens array corresponding one-to-one correspond to the photodiodes and the at least one feedback VCSELs, the multiple exit faces of the second Z-block-shaped prism corresponding one-to-one to the photodiodes and the feedback VCSEL; and wherein the multiple VCSELs at the emitting end are arranged in parallel, one end thereof having at least one feedback photodiode configured to receive the feedback signal, lenses of the first focusing lens array corresponding one-to-one to the VCSELs and the at least one feedback photodiode at the emitting end, the multiple incident faces of the first Z-block-shaped prism corresponding one-to-one to the VCSELs and the at least one feedback photodiode at the emitting end.

2. The short-waveband active optical component according to claim 1, wherein the emitting end has 3 to 14 VCSELs and the at least one feedback photodiode; and wherein the receiving end has 3 to 14 photodiodes and the at least one feedback VCSEL.

3. The short-waveband active optical component according to claim 1, the arrangement spacing between adjacent VCSELs or between adjacent photodiodes or between the VCSEL and the photodiode at the receiving end or emitting end is 0.25 mm to 1 mm.

4. The short-waveband active optical component according to claim 1, wherein the lenses of the first focusing lens array at the emitting end and the lenses of the second focusing lens array at the receiving end are both spherical lenses or aspheric lenses.

5. The short-waveband active optical component according to claim 1, wherein the first Z-block-shaped prism at the emitting end and the second Z-block-shaped prism at the receiving end each have a thickness of 0.2 mm to 3 mm; and wherein the first and second Z-block-shaped prisms are arranged obliquely to form an angle of 6° to 45° respectively with the first and second end of the multi-mode optical fiber, the emitting end of the VCSELs, or the receiving end of the photodiodes.

6. The short-waveband active optical component according to claim 1, wherein the multi-mode optical fiber is a transparent optical fiber having a fiber core, and wherein a core diameter of the fiber core is not less than 0.03 mm.

7. The short-waveband active optical component according to claim 1, wherein the lenses of the first focusing lens and the second focusing lens are both spherical lenses or aspheric lenses integrally formed by injection molding, molding, or photolithography.

8. A high-definition multimedia interface device comprising the short-waveband active optical component according to claim 1.

9. A short-waveband active optical component, comprising the short-waveband active optical component according to claim 1, wherein an operating wavelength thereof is 600 nm to 1000 nm, and a wavelength channel interval thereof is 20 nm to 100 nm.

10. A short-waveband active optical component, comprising:

an emitting end comprising:
a plurality first vertical-cavity surface-emitting lasers (VCSELs) being arranged in parallel, each being configured to emit an optical signal,
at least one first photodiode being arranged in parallel to the first VCSELs and being configured to receive at least one feedback signal,
a first array having first lenses and at least one second lens, the first lenses disposed in one-to-one optical communication with the first VCSELs, the at least one second lens disposed in optical communication with the at least one first photodiode,
a first Z-block-shaped prism having a plurality of incident faces, an exit end, and at least one output face, the incident faces disposed in one-to-one optical communication with the first lenses, the at least one output face disposed in optical communication with the at least one second lens, and
a first intermediate focusing lens disposed in optical communication with the exit end of the first Z-block-shaped prism;

a multi-mode optical fiber having a first end and a second end, the first end disposed in optical communication with the first intermediate lens; and a receiving end comprising:
a second intermediate lens disposed in communication with the second end of the multi-mode optical fiber,
a second Z-block-shaped prism having an incident end, a plurality of exit faces, and at least one input face, the incident end disposed in optical communication with the second intermediate lens,
a second array having third lenses and at least one fourth lens, the third lenses disposed in one-to-one optical communication with the exit faces, the at least one fourth lens disposed in optical communication with the at least one input face,
a plurality of second photodiodes being arranged in parallel and disposed in one-to-one optical communication with the third lenses, and
at least one second VCSEL arranged in parallel with the second photodiodes, the at least one second VCSEL being configured to emit the at least one feedback signal, the at least one second VCSEL disposed in optical communication with the at least one fourth lens.

11. The short-waveband active optical component of claim 10, wherein the emitting end comprises three to fourteen of the first VCSELs; and wherein the receiving end comprises three to fourteen of the second photodiodes.

12. The short-waveband active optical component of claim 10, wherein the first VCSELs are arranged adjacent one another at a first spacing of 0.25 mm to 1 mm; and/or wherein the second photodiodes are arranged adjacent one another at a second spacing of 0.25 mm to 1 mm.

13. The short-waveband active optical component of claim 10, wherein each of the first lenses, the at least one second lens, the third lenses, and the at least one fourth lens comprise a spherical lens or an aspheric lens.

14. The short-waveband active optical component of claim 10, wherein each of the first and second Z-block-shaped prisms comprises a thickness of 0.2 mm to 3 mm; and wherein each of the first and second Z-block-shaped prisms is arranged obliquely to form an angle of 6° to 45° respectively with the first and second end of the multi-mode optical fiber, the first and second VCSELs, or the first and second photodiodes.

15. The short-waveband active optical component of claim 10, wherein the multi-mode optical fiber comprises a transparent optical fiber having a fiber core with a core diameter not less than 0.03 mm.

16. The short-waveband active optical component of claim 10, wherein the first lenses of the first array and the second lens of the second array comprise spherical lenses or aspheric lenses integrally formed by injection molding, molding, or photolithography.

17. The short-waveband active optical component of claim 10,
wherein the first VCSELs are each configured to emit the optical signal to a respective one of the first lenses of the first array, each of the first lenses being configured to focus the respective optical signal to a respective one of the incident faces of the first Z-block-shaped prism, the exit end of the first Z-block-shaped prism being configured to output the optical signals to the first intermediate lens, the first intermediate lens being configured to input the optical signals to the first end of the multi-mode optical fiber; and
wherein the second intermediate lens is configured to focus the optical signals from the second end of the multimode optical fiber to the incident end of the second Z-block-shaped prism, each of the exit faces of the second Z-block-shaped prism being configured to output a respective one of the optical signals to a respective one of the third lenses of the second array, each of the third lenses being configured to focus the respective one of the optical signals to the respective one of the second photodiodes.

18. The short-waveband active optical component of claim 10,
wherein the at least one second VCSEL is configured to emit the at least one feedback signal, the at least one fourth lens of the second array being configured to focus the at least one feedback signal to the at least one input face, the incident end being configured to output the at least one feedback signal to the second intermediate lens, the second intermediate lens being configured to input the at least one into the second end of the multi-mode optical fiber; and
wherein the first intermediate lens is configured to direct the at least one feedback signal to the exit end of the second Z-block-shaped prism, the at least one output face being configured to output the at least one feedback signal to the at least one second lens of the first array, the at least one second lens being configured to focus the at least one feedback signal to the at least one first photodiode.

19. A high-definition multimedia interface device having the short-waveband active optical component of claim 10.

20. The short-waveband active optical component of claim 10, wherein an operating wavelength thereof is 600 nm to 1000 nm; and wherein a wavelength channel interval thereof is 20 nm to 100 nm.

* * * * *